3,221,168
RADIATION TRACKING SYSTEM USING LATERAL PHOTOEFFECT TRANSDUCER
Claude L. Patterson III, Mineola, N.Y., assignor to Sperry Rand Corporation, Great Neck, N.Y., a corporation of Delaware
Filed Apr. 30, 1962, Ser. No. 190,859
12 Claims. (Cl. 250—203)

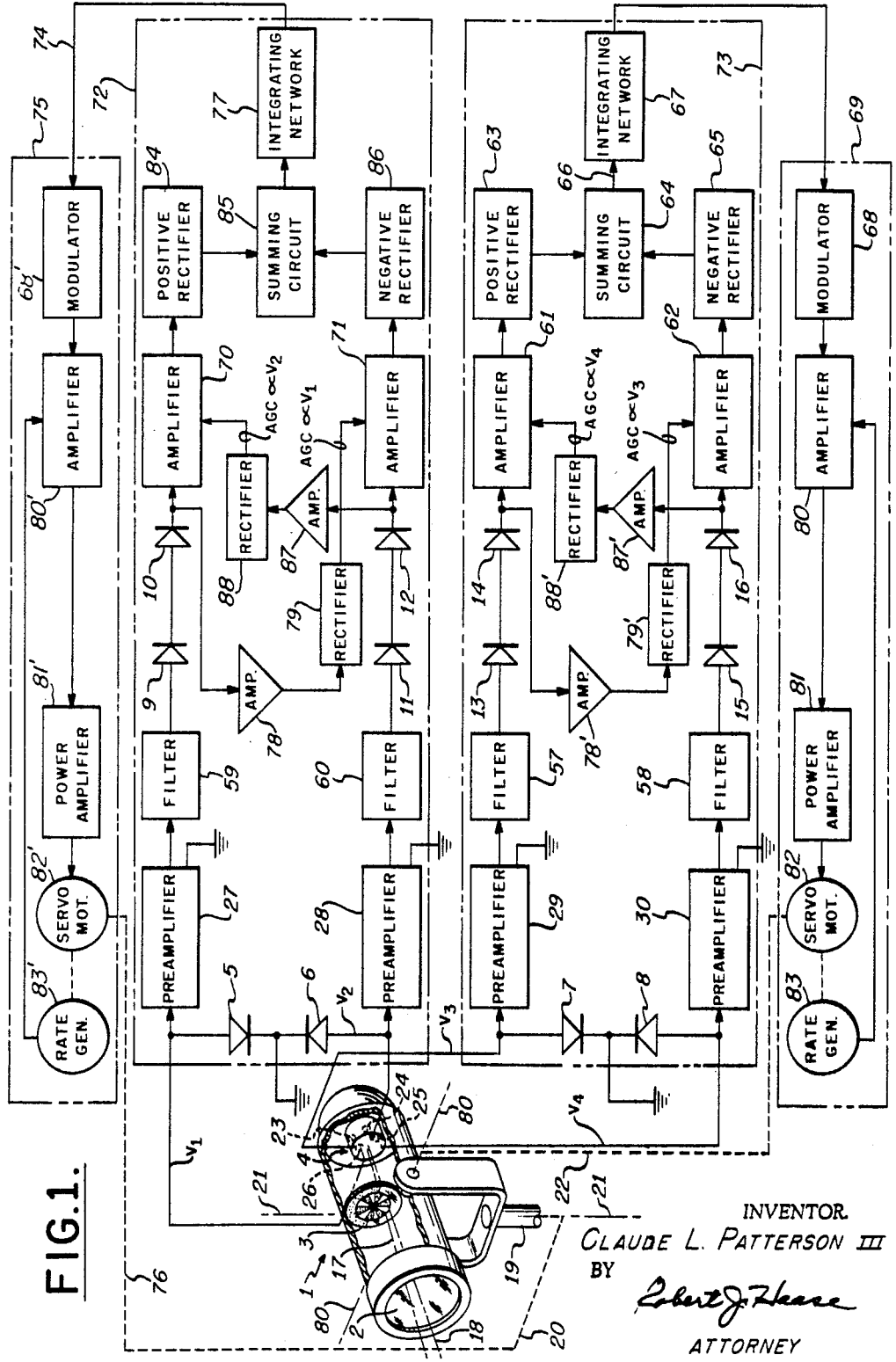

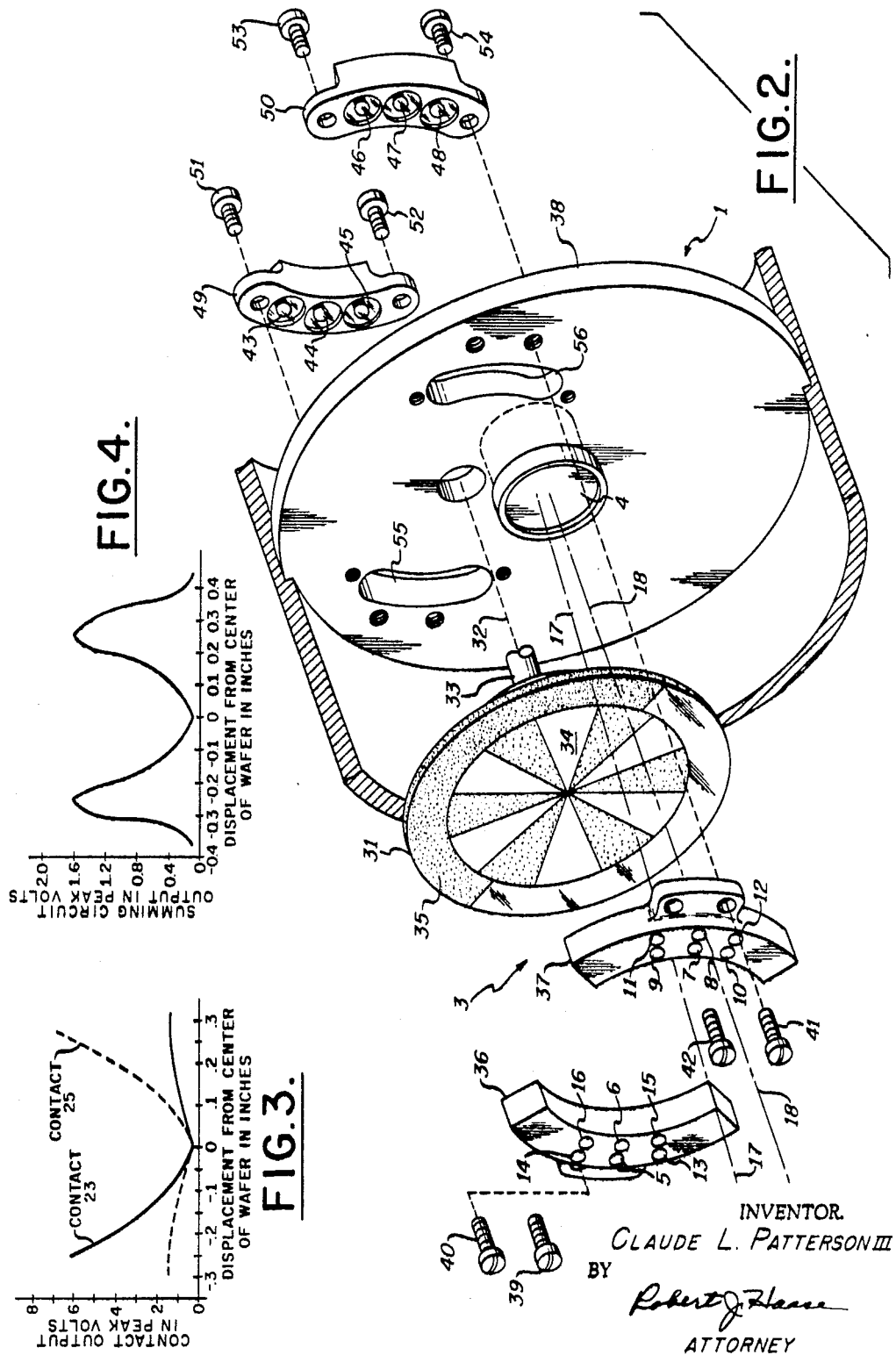

The present invention generally relates to systems for passively tracking sources of electromagnetic radiation and, more particularly, to a system utilizing a lateral photoeffect transducer for tracking sources of light in space.

A typical lateral photoeffect transducer is described in the December 1960 IRE Transactions on Instrumentation in the article entitled Radiation Tracking Trasnducer by D. Allen et al. beginning on page 336. Briefly stated, the lateral photoeffect transducer comprises a wafer of semiconductive material which produces a pair of output electrical potentials representing the orthogonal components of the position of a beam of light impinging on the face of the wafer. The amplitudes of the potentials fall to zero when the beam impinges on the center of the wafer. Thus, the lateral photoeffect transducer is a device capable of detecting the position of sources of electromagnetic radiation (such as a target which is emitting or reflecting light) without requiring any scanning device. The entire field of view in which the target is situated is surveyed instantaneously. So long as the light received from the target impinges on the surface of the transducer wafer, electrical potentials are instantaneously produced representing the spatial position of the target within the field of view.

As is well understood in the art, radiation tracking transducers are susceptible to light emanating from sources other than the desired target. Such sources include, for example, clouds which are reflecting sunlight. The desired target, such as an aircraft, generally is of less cross sectional area than the sources of the background or interfering light. This difference in cross sectional area between the desired and the interfering light sources facilitates discrimination through the use of techniques such as those described in "The Technique of Spatial Filtering," by G. F. Aroyan in the September 1959 IRE Proceedings beginning on page 1561.

A serious problem arises, however, when it is desired to simultaneously exploit the advantages accruing to the use of the lateral photoeffect transducer and the spatial filtering devices of the moving reticle type. It has been found that when the light impinging on the transducer wafer is interrupted or "chopped" by a moving reticle, multiple ambiguities arise in the electrical potentials generated by the wafer. In other words, the use of reticle filtering devices effectively incapacitates the described lateral photoeffect transducer as an angular position detector of sources of electromagnetic radiation.

It is the principal object of the present invention to provide a radiation tracking system utilizing a lateral photo-effect transducer and being capable of discriminating between sources of electromagnetic radiation of differing cross sectional areas.

Another object is to provide a radiation tracking system utilizing a lateral photoeffect transducer and spatial filtering devices of the moving reticle type.

A further object is to provide a radiation tracking system utilizing a lateral photoeffect transducer of low noise equivalent power and distinguishing between desired sources of light of small cross sectional areas and interfering sources of light of large cross sectional areas.

An additional object is to provide a radiation tracking system utilizing a lateral photoeffect transducer and a spatial filtering device of the moving reticle type which is substantially non-responsive to amplitude variations in the electromagnetic energy being tracked.

These and other objects of the present invention, as will appear from a reading of the following specification, are accomplished in a preferred embodiment by a provision of a two axis radiation tracking system including a lateral photoeffect transducer and a spinning reticle. The lateral photoeffect transducer produces a pair of electrical potentials representing the orthogonal components of the spatial position of a beam of light emanating from a desired target and impinging upon the transducer. An optical system is provided to focus the received rays of light on the transducer. The focused light is interrupted or "chopped" by a spinning reticle having predetermined transparent and opaque regions which reticle is located between the optical system and the transducer wafer. Each of the electrical potentials generated by the wafer are made available between a respective pair of diametrically opposed ohmic contacts fixed to the wafer. Four equally spaced ohmic contacts are provided on the wafer in the preferred embodiment.

Provision is made for short circuiting the respective ohmic contact pairs in alternation. The short circuited contacts are connected to ground whereby the potentials generated at each of the two unshorted contacts are referenced to ground potential. The form of the potentials generated at each of the unshorted contact terminals is a square wave having a frequency determined by the pattern of transparent and opaque areas on the reticle and the angular rate of the spinning reticle. The amplitude of each square wave is a function of the intensity of the light impinging on the transducer wafer, the cross sectional area of the impinging light and the position at which the light impinges on the transducer wafer. Sources of relatively small cross sectional area produce square waves of relatively high amplitude. Conversely, sources of relatively large cross sectional areas produce square waves of relatively small amplitude. Thus, the "conversion efficiency" (amplitude of square wave vs. intensity of the light source) is high for small sources whereas the conversion efficiencey for large sources is small. The result is that large targets are discriminated against in favor of small targets.

In the event that the light impinges on the transducer wafer at a location other than its center, two square wave potentials of unequal amplitude are generated at the two unshorted wafer contacts. Said square wave potentials are amplified and bandpass filtered and then differentially combined to produce an error signal representing the deviation of the impinging light from the center of the transducer wafer along one orthogonal axis. The error signal is utilized to orient the transducer along said orthogonal axis to reduce the amplitude of the error signal to zero whereupon the light impinges along one center line of the transducer wafer. Similarly, when the originally shorted pair of wafer contacts are unshorted and the originally unshorted pair are shorted to ground, a second error signal is generated representing the deviation of the impinging light from the center of the wafer along the second of the orthogonal axis. The second error signal positions the wafer along said second orthogonal axis in such a sense and by such an amount to reduce the second error signal to zero. The transducer wafer is oriented so as to cause the light to impinge at the optical center of the wafer when both error signals are reduced to zero.

Provision is also made for rendering the aforementioned error signal substantially independent of the intensity of the light impinging on the lateral photoeffect transducer wafer. In particular, an automatic gain control voltage is produced by each of the potentials produced at the wafer contacts. Each gain control voltage controls the gain of the amplifiers associated with the signal produced at the wafer contact diametrically opposed to the wafer contact producing the gain control voltage.

For a more complete understanding of the present invention reference should be had to the following specification and to the appended figures of which:

FIG. 1 is a simplified diagram of a preferred embodiment of the present invention;

FIG. 2 is a simplified exploded view representation of the spinning reticle assembly and light-actuated switch components represented in FIG. 1;

FIG. 3 is a plot representing the signals generated by the transducer of FIG. 1; and FIG. 4 is a plot representing the signals produced at the outputs of the summing circuits of FIG. 1.

Referring to FIG. 1, the reference numeral 1 generally designates a positionable optical head assembly comprising optics 2, spinning reticle assembly 3 and lateral photoeffect transducer 4. Assembly 1 also includes light-actuated photo diodes 5, 6, 7, 8, 9, 10, 11, 12, 13, 14, 15 and 16 as shown in FIG. 2. Said photo diodes are located in the simplified diagram of FIG. 1 in accordance with their electrical positions in circuit, rather than their actual physical location, to simplify the description. A beam of light 17 emanating from or reflected by a desired target is focused by optics 2 to impinge on the surface of transducer 4 at a position depending upon the direction of light beam 17 relative to optical axis 18 of assembly 1. The light beam 17 focused by optics 2 is interrupted or "chopped" by the action of spinning reticle 3 interposed between optics 2 and transducer 4. Assembly 1 is supported by yoke 19 which is rotatably driven by shaft 20 about vertical axis 21. Assembly 1 further is positioned about horizontal axis 80 by shaft 22.

Lateral photoeffect transducer 4 is provided with four ohmic contacts 23, 24, 25 and 26. In the event that the focused beam of light impinges on transducer 4 at a location other than the optical center of transducer 4, a pair of potentials are produced between contacts 23 and 25 and between contacts 24 and 26 representing the orthogonal components of the position of the impinging beam 17 relative to the optical axis 18 of the assembly 1. Ohmic contacts 23, 24, 25 and 26 are connected to preamplifiers 27, 28, 29 and 30, respectively. Contacts 23 and 25 are also connected to ground when photo diodes 7 and 8 are rendered conductive. Similarly, contacts 24 and 26 are connected to ground when photo diodes 5 and 6 are rendered conductive.

The manner in which photo diodes 5–16 inclusive are rendered conductive will be described with the aid of FIG. 2. Referring to FIG. 2, reticle assembly 31 of reticle and switch components 3 is supported for rotation about axis 32. Reticle 31 is spun about axis 32 by shaft 33 driven by a motor (not shown). Reticle 31 comprises two concentric portions 34 and 35. Innermost circular portion 34 may consist of any of the well known reticle configurations such as described in the aforementioned paper by Aroyan for chopping the focused light beam 17 as it is focused on the surface of transducer 4. Outermost annular portion 35 comprises an opaque region (indicated by a stippling) and a transparent region. Focused light beam 17 is interrupted only by the reticle portion 34 because it always passes interior to the outermost annular portion 35. Annular portion 35 controls the operation of photo diodes 14, 16, 5, 6, 13 and 15 supported by bracket 36 and controls the operation of photo diodes 9, 11, 7, 8, 10 and 12 supported by bracket 37. Brackets 36 and 37, in turn, are fixed to supporting plate 38 by screws 39 and 40 and by screws 41 and 42, respectively. The photo diodes are energized by light emitted by lamps 43, 44, 45, 46, 47 and 48 supported within brackets 49 and 50. Brackets 49 and 50, in turn, are fixed to supporting plate 38 by screws 51, 52, 53 and 54. The light emitted by lamps 43, 44 and 45 passes through aperture 55 in plate 38 and energizes diodes 14, 16, 5, 6, 13 and 15 when not blocked by the opaque portion 35 of spinning reticle 31. Similarly, the light emitted by lamps 46, 47 and 48 passes through aperture 56 and energizes diodes 9, 11, 7, 8, 10 and 12 when not blocked by said opaque portion 35. It will be seen that when spinning reticle 31 is in the position indicated in FIG. 2, opaque portion 35 blocks the passage of light to diodes 9, 11, 7, 8, 10 and 12 and permits the passage of light to diodes 14, 16, 5, 6, 13 and 15 whereby the former diodes are rendered non-conductive and the latter diodes are rendered conductive.

Returning to FIG. 1 and assuming that diodes 14, 16, 5, 6, 13 and 15 are rendered conductive, the potentials generated at ohmic contacts 23 and 25 of transducer 4 are referenced to ground by the conduction of diodes 5 and 6 are applied to preamplifiers 29 and 30, respectively. In the assumed case where the focused light beam impinges off the center of transducer 4, unequal potentials are generated at ohmic contacts 23 and 25. Each of said potentials are in the form of square waves having a frequency determined by the pattern of transparent and opaque areas on the inner circular reticle 34 and the angular rate at which reticle 31 is spun. In a typical case, where reticle assembly 31 is spun at 200 revolutions per second and inner reticle portion 34 comprises 35 transparent and 35 opaque radial spokes similar to the reticle of FIG. 1 of the aforementioned Aroyan paper, the frequency of the square wave potential generated at ohmic contacts 23 and 25 is 7,000 cycles per second. The difference between the amplitude of the square waves developed at contacts 23 and 25 is proportional to the deviation of the light beam from the optical axis 18 at the point where said light beam impinges on the surface of transducer 4. This can be seen more clearly by reference to FIG. 3 which is a typical plot of the amplitude of the square wave potentials generated at contacts 23 and 25, for example, as a function of displacement of the impinging light from the optical center of the transducer wafer 4. The square waves are amplified in preamplifiers 29 and 30 and bandpass filtered in filters 57 and 58, respectively. Filters 57 and 58, like filters 59 and 60 to be described later, are designed to pass signals at a frequency of about 7,000 cycles per second.

The square waves passed by filters 57 and 58 and by conducting photo diodes 13, 14, 15 and 16 are further amplified in amplifiers 61 and 62, respectively. The amplified square wave at the output of amplifier 61 is applied by positive rectifier 63 to a first input of summing circuit 64. The amplified square wave at the output of amplifier 62 is applied by negative rectifier 65 to a second input of summing circuit 64. Rectifier 63 produces a train of positive half cycle pulses whereas rectifier 65 produces a train of negative half cycle pulses. The amplitude of the positive pulses is proportional to the amplitude of the square wave developed at ohmic contact 23 of transducer 4. The amplitude of the negative pulses developed by rectifier 65 is proportional to the amplitude of the square wave developed at contact 25 of transducer 4. The summation of the positive and negative pulses in summing circuit 64 effectively subtracts the amplitudes of the square waves developed at contacts 23 and 25 to produce a resultant signal on line 66 having an amplitude proportional to the amplitude difference. FIG. 4 shows the amplitude of a typical differential signal produced, for example, at the output of circuit 64 as a function of displacement of the impinging light from the optical center of the transducer wafer 4. The D.C. component of the resultant signal appearing on line 66 is extracted by integrating network 67 and applied to modulator 68.

Modulator 68 is the input stage of a conventional positioning servo 69 which positions shaft 22 in a direction determined by the polarity of the D.C. component extracted by network 67 and by an amount related to the amplitude of said extracted D.C. component. Conventional servo 69 comprises modulator 68, amplifier 80, power amplifier 81, servo-motor 82 and rate generator 83. Modulator 68 converts the D.C. signal at the output of network 67 to an alternating signal of convenient frequency for operating A.C. servomotor 82. Conventional rate feedback to amplifier 80 is provided by generator 83 which is coupled to rotate synchronously with the output shaft 22 of servomotor 82. Shaft 22 rotates optical head assembly 1 about horizontal axis 80 in such a sense and by such an amount that the light beam is caused to impinge on transducer 4 along a line between ohmic contacts 24 and 26 whereupon the extracted D.C. component at the output network 67 falls to zero.

Referring again to FIG. 2, it will be seen that when reticle assembly 31 is rotated 180° from the position indicated, opaque annular portion 35 will block the light from reaching photo diodes 14, 16, 5, 6, 13 and 15 and will permit the passage of light to photo diodes 9, 11, 7, 8, 10 and 12. In this case, the former photo diodes are rendered non-conductive and the latter diodes are rendered conductive. Consequently, the potentials appearing at ohmic contacts 26 and 24 of transducer 4 are referenced to ground potential by conducting diodes 7 and 8 and are applied to preamplifiers 27 and 28. At the same time diodes 9, 10, 11 and 12 conductively connect the output of filters 59 and 60 to the inputs of amplifiers 70 and 71. The output wave from amplifier 70 is applied by positive rectifier 84 to a first input of summing circuit 85. The output wave from amplifier 71 is applied by negative rectifier 86 to a second input of summing circuit 85. Rectifier 84 provides positive output pulses whereas rectifier 86 provides negative output pulses. The amplitude of the positive pulses is proportional to the amplitude of the square wave developed at ohmic contact 26 of transducer 4. The amplitude of the negative pulses developed by rectifier 86 is proportional to the amplitude of the square wave developed at contact 24 of transducer 4. The summation of the positive and negative pulses in summing circuit 85 effectively subtracts the amplitudes of the square waves developed at contacts 26 and 24 to produce a resultant signal on line 74 having an amplitude proportional to the amplitude difference. The azimuth position channel 72 then operates in a fashion similar to that previously described in connection with elevation position channel 73 to produce a D.C. signal on line 74 representing the deviation of the impinging light on transducer 4 from the center thereof along lines parallel to a line drawn between the contacts 26 and 24. Positioning servo 75 consists of the primed numeral components 68', 80', 81', 82' and 83' and, in the manner of the previously described equivalent positioning servo 69, responds to the applied D.C. component to position its respective output shaft 76 and rotates optical head assembly 1 so that the target light beam impinges on the surface of transducer 4 along a line drawn between contacts 23 and 25. When the D.C. components at the outputs of azimuth and elevation channels 72 and 73 are both reduced to zero simultaneously, the light emanating from the target will impinge at the optical center of transducer 4 whereupon the optical axis 18 of assembly 1 has been aligned with the direction of the target being tracked.

Two additional features of the present invention remain to be considered. At the times when photo diodes 5 and 6 and photo diodes 7 and 8 are rendered conductive or non-conductive by the action of portion 35 of reticle assembly 31, undesired transient "spikes" are produced in the signals generated at the unshorted pair of ohmic contacts of transducer wafer 4. Thus, it is desirable, for example, that amplifiers 70 and 71 be connected to the outputs of filters 59 and 60, respectively, only at times other than when photo diodes 7 and 8 are rendered conductive or non-conductive. Precisely such a result is accomplished by the coaction between the spinning reticle assembly 31, the light sources, and the photo diodes depicted in FIG. 2.

Assuming clockwise rotation of reticle assembly 31, it will be seen that the opaque portion 35 first blocks the light from lamp 46 from energizing photo diodes 9 and 11, then blocks the light from lamp 47 from energizing photo diodes 7 and 8, and then blocks the light from lamp 48 from energizing photo diodes 10 and 12. In this manner, amplifiers 70 and 71 are disconnected from filters 59 and 60, respectively, prior to the conduction of diodes 7 and 8 (causing the aforementioned desired transients in the signals at contacts 26 and 27). A comparable sequence of photo diode actuations occurs after an additional 180° rotation of reticle assembly 31. At that time, the leading edge of transparent region of annular portion 35 first exposes photo diodes 9 and 11 to lamp 46, then exposes photo diodes 7 and 8 to lamp 47, and then exposes photo diodes 10 and 12 to lamp 48. This action delays the connection of amplifiers 70 and 71 to the outputs of filters 59 and 60, respectively, until after the transient producing conduction of diodes 7 and 8 is effected.

Provision is also made in the preferred embodiment for eliminating variations in the output signals produced by integrating networks 67 and 77 attributable to intensity variations in the light impinging on transducer wafer 4. This is accomplished by the provision of automatic gain control circuits for controlling the gain of amplifiers 70, 71, 61 and 62. The signal at the output of photo diode 10 is amplified in amplifier 78, rectified in rectifier 79 and then applied to amplifier 71 as a gain control signal. Similarly, the signal at the output of photo diode 12 is amplified in amplifier 87, rectified in rectifier 88, and applied to amplifier 70 to control the gain thereof. An identical gain control circuit provision is made for amplifiers 61 and 62; the primed numerals 78', 79', 87' and 88' represent the components corresponding in structure and operation to components 78, 79, 87 and 88, respectively. It can be shown that the described gain control action renders the signal at the outputs of integrating networks 67 and 77 insensitive to intensity variations on the light impinging on wafer 4 whereby said signals are functions only of the position at which the light beam impinges on the wafer.

From the preceding specification, it can be seen that the objects of the present invention have been achieved by the provision of a radiation tracking system including a lateral photoeffect transducer and a spinning reticle. The diagonally opposed ohmic contact pairs of the transducer wafer are shorted to ground in alternation. The square wave potentials generated at the unshorted contact pairs are bandpass filtered and differentially compared to produce a signal for controlling the orientation of the optical head assembly containing said transducer wafer to align said optical assembly along the direction of the received light. Provision is also made for eliminating the effect of undesired transients produced by the wafer contact shorting action and for rendering the tracking system substantially non-responsive to variations in the intensity of the received light.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. In a radiation detecting system, apparatus comprising a lateral photoeffect transducer having two pairs of diametrically opposed ohmic contacts generating voltages related to the position at which electromagnetic radiation impinges on said transducer, means to intermittently short circuit to ground a first pair of said contacts, reticle means for interrupting said radiation impinging on said transducer, and means for differentially comparing the voltages generated at a second pair of said contacts to produce an output signal representing the position at which said radiation impinges on said transducer.

2. A radiation detecting system comprising a lateral photoeffect transducer having four ohmic contacts generating voltages related to the position at which electromagnetic radiation impinges on said transducer,
means to intermittently short circuit to ground one diametrically opposed pair of said contacts,
moving reticle means for interrupting said radiation impinging on said transducer,
and means for differentially comparing the voltages generated at the other pair of said contacts to produce an output signal representing the position at which said radiation impinges on said transducer.

3. A radiation detecting system comprising a lateral photoeffect transducer having four ohmic contacts generating voltages related to the position at which electromagnetic radiation impinges on said transducer,
means to intermittently short circuit to ground one diametrically opposed pair of said contacts,
moving reticle means for interrupting said radiation impinging on said transducer,
and means including bandpass filtering means for differentially comparing the voltages generated at the other pair of said contacts to produce an output signal representing the position at which said radiation impinges on said transducer.

4. In a radiation tracking system, apparatus comprising a lateral photoeffect transducer having two pairs of diametrically opposed ohmic contacts generating voltages related to the position at which electromagnetic radiation impinges on said transducer,
means to intermittently short circuit to ground a first pair of contacts,
reticle means for interrupting said radiation impinging on said transducer,
means for differentially comparing the voltages generated at a second pair of said contacts to produce an output signal representing the position at which said radiation impinges on said transducer,
and means responsive to said output signal for orienting said transducer relative to the direction of said radiation impinging on said transducer.

5. A radiation tracking system comprising a lateral photoeffect transducer having four ohmic contacts generating voltages related to the position at which electromagnetic radiation impinges on said transducer,
means to intermittently short circuit to ground one diametrically opposed pair of said contacts,
reticle means for interrupting said radiation impinging on said transducer,
means for differentially comparing the voltages generated at the other pair of said contacts to produce an output signal representing the position at which said radiation impinges on said transducer,
and means responsive to said output signal for orienting said transducer relative to the direction of said radiation impinging on said transducer.

6. A radiation tracking system comprising a lateral photoeffect transducer having four ohmic contacts generating voltages related to the position at which electromagnetic radiation impinges on said transducer,
means to intermittently short circuit to ground one diametrically opposed pair of said contacts,
moving reticle means for interrupting said radiation impinging on said transducer,
means including bandpass filtering means for differentially comparing the voltages generated at the other pair of said contacts to produce an output signal representing the position at which radiation impinges on said transducer,
and means responsive to said output signal for orienting said transducer relative to the direction of said radiation impinging on said transducer.

7. A radiation detecting system comprising a lateral photoeffect transducer having two pairs of diametrically opposed ohmic contacts generating voltages related to the position at which electromagnetic radiation impinges on said transducer,
means for shorting a first pair of said contacts to ground and a second pair of said contacts to ground in alternation, said first pair being shorted together when said second pair is unshorted and vice versa,
reticle means for interrupting said radiation impinging on said transducer,
and means for differentially comparing the voltages generated at the alternately unshorted pairs of said contacts to produce first and second output signals in alternation representing the orthogonal components of the position at which said radiation impinges on said transducer.

8. A radiation detecting system comprising a lateral photoeffect transducer having two pairs of diametrically opposed ohmic contacts generating voltages related to the position at which electromagnetic radiation impinges on said transducer,
means for shorting a first pair of said contacts to ground and a second pair of said contacts to ground in alternation, said first pair being shorted together when said second pair is unshorted and vice versa,
moving reticle means for interrupting said radiation impinging on said transducer,
and means including bandpass filtering means for differentially comparing the voltages generated at the alternately unshorted pairs of said contacts to produce first and second output signals in alternation representing the orthogonal components of the position at which said radiation impinges on said transducer.

9. A radiation tracking system comprising a lateral photoeffect transducer having two pairs of diametrically opposed ohmic contacts generating voltages related to the position at which electromagnetic radiation impinges on said transducer,
means for shorting a first pair of said contacts to ground and a second pair of said contacts to ground in alternation, said first pair being shorted together when said second pair is unshorted and vice versa,
reticle means for interrupting said radiation impinging on said transducer,
means for differentially comparing the voltages generated at the alternately unshorted pairs of said contacts to produce first and second output signals in alternation representing the orthogonal components of the position at which said radiation impinges on said transducer,
and means responsive to said first and second output signals for orienting said transducer relative to the direction of said radiation impinging on said transducer.

10. A radiation tracking system comprising a lateral photoeffect transducer having two pairs of diametrically opposed ohmic contacts generating voltages related to the position at which the electromagnetic radiation impinges on said transducer,
means for shorting a first pair of said contacts to ground and a second pair of said contacts to ground in alternation, said first pair being shorted together when said second pair is unshorted and vice versa,
moving reticle means for interrupting said radiation impinging on said transducer,
means including bandpass filtering means for differentially comparing the voltages generated at the alternately unshorted pairs of said contacts to produce first and second output signals in alternation representing the orthogonal components of the position at which said radiation impinges on said transducer,
and means responsive to said first and second output signals for orienting said transducer relative to the direction of said radiation impinging on said transducer.

11. A radiation detecting system comprising a lateral photoeffect transducer having four ohmic contacts generating voltages related to the position at which electromagnetic radiation impinges on said transducer,
means to intermittently short circuit to ground one diametrically opposed pair of said contacts,
reticle means for interrupting said radiation impinging on said transducer,
first and second controllable gain amplifying means connected to respective ones of the other pair of said contacts,
first and second automatic gain control circuits connected to the inputs of said first and second amplifiers, respectively, said first and second circuits producing first and second gain control voltages, said first voltage being applied to control the gain of said second amplifier and said second voltage being applied to control the gain of said first amplifier,
and means for differentially comparing the voltages generated at the outputs of said first and second amplifiers to produce an output signal representing the position at which said radiation impinges on said transducer.

12. A radiation tracking system comprising a lateral photoeffect transducer having four ohmic contacts generating voltages related to the position at which electromagnetic radiation impinges on said transducer,
means to intermittently short circuit to ground one diametrically opposed pair of said contacts,
reticle means for interrupting said radiation impinging on said transducer,
first and second controllable gain amplifying means connected to respective ones of the other pair of said contacts,
first and second automatic gain control circuits connected to the inputs of said first and second amplifiers, respectively, said first and second circuits producing first and second gain control voltages, said first voltage being applied to control the gain of said second amplifier and said second voltage being applied to control the gain of said first amplifier,
means for differentially comparing the voltages generated at the outputs of said first and second amplifiers to produce an output signal representing the position at which said radiation impinges on said transducer,
and means responsive to said output signal for orienting said transducer relative to the direction of said radiation impinging on said transducer.

References Cited by the Examiner
UNITED STATES PATENTS

| | | | |
|---|---|---|---|
| 2,967,247 | 1/1961 | Turck | 250—203 |
| 3,007,053 | 10/1961 | Merlen | 250—233 X |
| 3,028,500 | 4/1962 | Wallmark | 250—211 |
| 3,032,660 | 5/1962 | Kim | 250—83.3 |
| 3,034,405 | 5/1962 | Biberman et al. | 250—233 X |

OTHER REFERENCES

Aroyan: Proceedings of the IRE; vol. 47; September, 1959; pp. 1561–1568.

RALPH G. NILSON, *Primary Examiner.*

WALTER STOLWEIN, *Examiner.*